May 21, 1935.　　　N. O. PANZEGRAU　　　2,002,274
TRACK TYPE TRACTOR
Filed Feb. 23, 1934　　　2 Sheets-Sheet 1

Inventor
Norman O. Panzegrau
By ... Atty.

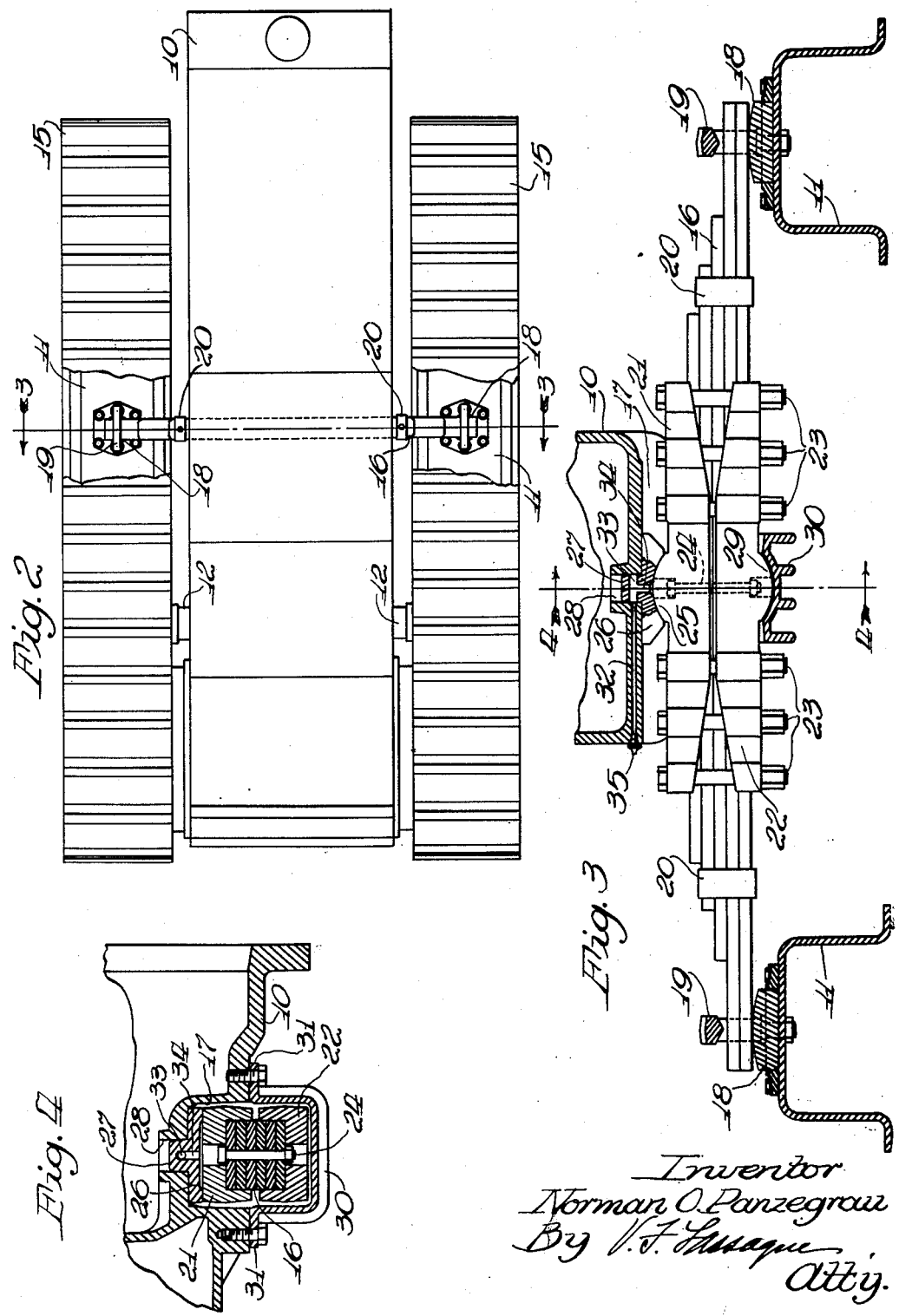

Patented May 21, 1935

2,002,274

UNITED STATES PATENT OFFICE 2,002,274

TRACK TYPE TRACTOR

Norman O. Panzegrau, Chicago, Ill., assignor to International Harvester Company, a corporation of New Jersey Application February 23, 1934, Serial No. 712,504

6 Claims. (Cl. 305—9)

The invention relates to improved means for supporting the main body of a track type tractor on the truck or track frames.

In this connection the usual practice is to mount the body on the track frames at three points of suspension, so that, when the tractor travels over uneven ground, the main frame or body will not be unduly strained and twisted. Thus, each track frame is pivoted at its rear to the body for two points of suspension, and a transverse equalizer bar has its ends resting on a forward portion of the track frames with the body pivotally connected to the equalizer bar midway and centrally between its ends for the third point of suspension.

In the smaller weight tractors, a relatively small diameter pivot pin suffices for the third point of support. However, in the larger, heavy duty tractors, it is desirable to employ a much stronger third point pivotal mounting, and accordingly the present invention more particularly relates to an improved third point mounting of the type mentioned for the heavier duty crawler tractors.

The main object of the invention, therefore, is to provide an improved third point support for tractors of the type mentioned.

Another object is to provide such a point of support which will eliminate the usual pivot pin.

Further, it is an object to provide such point of support combined with a leaf spring type of equalizer bar.

Still further, it is an object to provide a compact arrangement for such support.

Other objects will become apparent to those versed in this art as the disclosure is more fully made.

Such objects are achieved briefly in providing a leaf spring equalizer bar which has its central portion, midway between its ends, clamped between an upper and lower saddle block, which blocks include rounded pivot portions fitting respectively into upper and lower pad members having a configuration to receive said rounded pivot portions. The upper pad member is fitted into the bottom of the main body or frame and includes lubricating means, while the lower pad serves to secure the whole assembly to the frame or body in a compact manner and permits the equalizer spring to rock pivotally about the rounded portions of the saddles in performing its third point supporting and equalizing functions.

In the accompanying sheets of drawings illustrating a practicable example of the invention:

Figure 2 is a general plan view on a reduced scale, with portions of the track broken away to show the ends of the equalizer spring resting on the truck or track frame;

Figure 1:
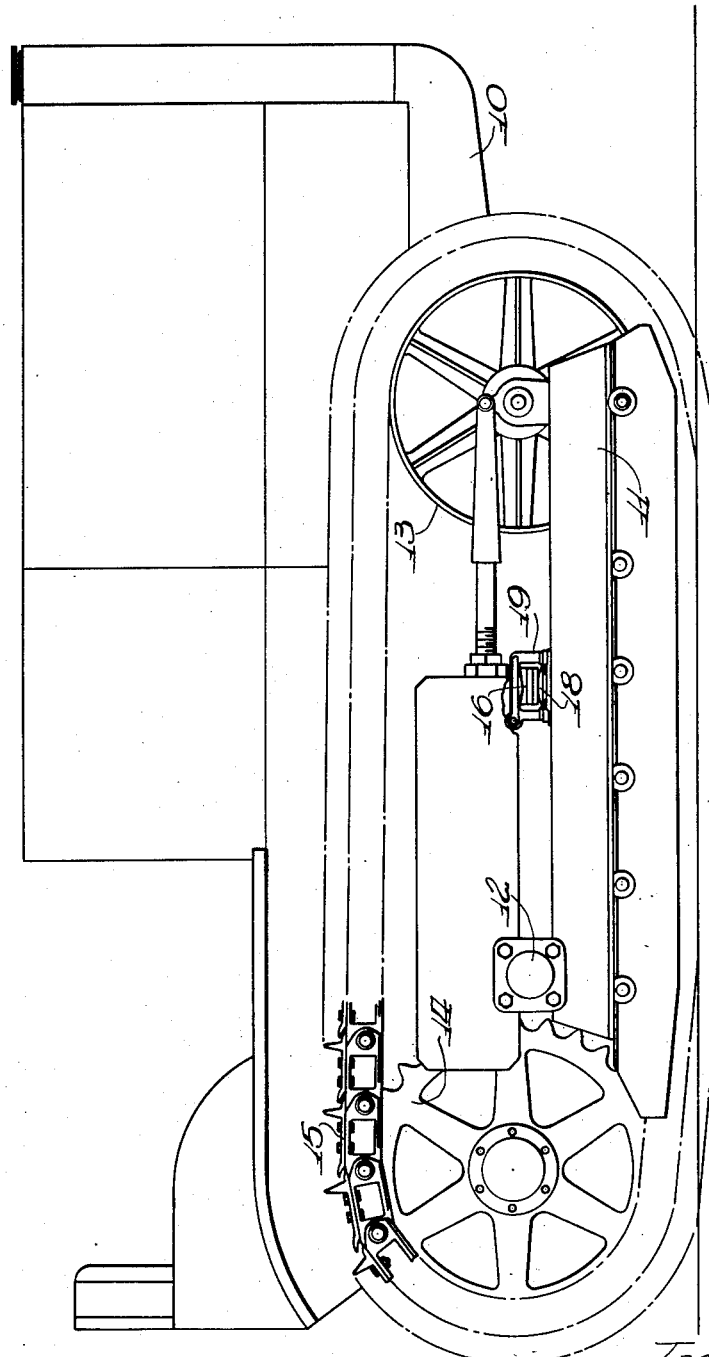
Figure 1 is a general side elevational view of the tractor embodying the improved equalizer.

Figure 3 is a detail, general front elevational view with parts in section to show the equalizer as seen approximately along the line 3—3 appearing in Figure 2 when viewed in the direction of the arrows; and, Figure 4 is a fragmentary sectional view longitudinally of the body to show a cross section of the equalizer as seen along the line 4—4 appearing in Figure 3, and looking in the indicated direction.

The tractor shown is of a common type having a body or frame 10 carrying the usual superstructure and having opposite sides of its rear end in weight bearing relation to the usual two opposite roller truck or track frames 11. These points of suspending the body are through pivots 12 for pivotally connecting the rear ends of the track frames 11 to the body 10. The front end of each track frame 11 carries an idler wheel 13, and the body 10 at its rear end on each side carries a driving sprocket wheel 14, there being the usual endless track belt 15 enveloping the frame 11 and wheels 13 and 14 on each side. The two pivotal points 12 thus permit each crawler unit to rise and fall independently to conform to ground contour as is common in these tractors.

The equalizer bar is a leaf spring assembly 16 extending transversely through a tunnel 17 formed on the under side of the body 10, said bar having its ends loosely and slidably resting on the transversely rounded rests 18 secured to the top side of the track frames 11, there being a guide loop bracket 19 over each equalizer spring end to prevent the spring ends from leaving the rests 18. These brackets also act as rebound clips so as to limit the main frame of the tractor from too much rebound bounce through the flexible leaves of the equalizer spring. An improved heavy duty third point of suspension for the body on the equalizer is provided and it will now be described.

The equalizer leaf spring is an assembly, or pack of separate leaf springs partly held together by clinch clips 20, while the middle portion of the spring pack is securely held between an upper saddle block 21 and a lower saddle block 22, said blocks being channel shaped to embrace the spring bar, as shown in Figure 4. Bolts 23 securely clamp the upper and lower blocks and spring together, while a countersunk screw bolt 24 is passed through the spring, as shown. The top saddle block 21 is formed with a rounded boss 25 that seats in a pad 26 having a concave, rounded depression to receive the boss 25 to form a free pivot surface. This pad 26 has an upward extension 27 slid into a vertical opening 28 in the floor of the frame or body 10.

Similarly, the lower saddle block 22 has a rounded boss 29 that fits a concave, rounded depression for pivotal movement in a lower pad 30 formed as a U-shaped bracket having flanges 31 securely bolted to the under side of the body, as shown in Figure 4. The depression in pad 30 acts the same in rebound as part 26 does in straight static load. This securely bolts the equalizer in load bearing relation to the body, and compactly in the tunnel 17, as shown. The bar 16 is, of course, free to pivot around the rounded bosses 25, 29 to form a flexible third point of support for the forward part of the body on the equalizer and track frames. This structure eliminates a physical pivot pin and provides a much larger pivot surface 25, 29 than a mere pin could provide. This is obviously desirable in a heavy tractor.

The body 10 has a bore 32 in alignment with a bore 33 in the extension 27, and, further, a downward passage 34 leads to the top surface of the rounded boss 25 to lubricate and prevent frictional wear between the pad 26 and boss 25. The lubricant can, of course, also work down between the lower pad 30 and the rounded boss 29. A grease nipple 35 serves as the means for supplying the lubricant.

In use as the tractor traverses uneven ground the track frames 11 rise and fall pivotally, and independently, about their pivots 12. Thus, as one frame 11 rises or falls, it carries the adjacent end of the equalizer 16 with it, causing the bar 16 to pivot about the third point of support; that is, the round bosses 25, 29 rock in their respective pads. This provides a sturdy load support for the forward weight of the body and provides the required flexibility to prevent twisting the main frame or body. It is to be noted that the rounded surfaces 25, 29 of the saddle members comprise surface portions of a common cylinder whose center is located centrally between said rounded surface portions as shown in Figure 3. Thus, in a sense, a relatively large cylinder becomes the pivot instead of the heretofore used relatively small pivot pin. Such large pivot is highly desirable in practice as it makes for a smooth pivot action and transmits the load to the side trucks better than the usual relatively small pivot pin.

It is the intention to cover all changes not departing from the invention as hereinafter claimed.

What is claimed is:

1. A tractor having a body and a pair of track frames pivotally connected at their rear ends to support the body thereon at two points, an equalizer spring carried transversely across the track frames and under the body, upper and lower saddle blocks clamped around the spring, said blocks having rounded portions formed as surfaces of a common cylinder whose axis is between the saddle blocks, and a lower pad member secured to the body and including a complementary rounded portion to receive the rounded portion of the lower saddle block whereby the equalizer may pivot on the body and form a central load support therefor.

2. A tractor having a body and a pair of track frames pivotally connected at their rear ends to support the body thereon at two points, an equalizer spring carried transversely across the track frames and under the body, upper and lower saddle blocks clamped around the spring, said blocks having rounded portions formed as surfaces of revolution having a common axis, an upper pad member between the body and the upper saddle block, said upper pad member having a rounded portion to receive the rounded portion on the upper saddle block, a lower pad member having a rounded portion complementary to and receiving the rounded portion of the lower saddle block, and means to secure the lower pad member to the body to hold the equalizer in pivotal weight carrying relationship to the body.

3. A tractor having a body and a pair of track frames pivotally connected at their rear ends to support the body thereon at two points, an equalizer spring carried transversely across the track frames and under the body, upper and lower saddle blocks clamped around the spring, said blocks having rounded portions which are formed as surfaces of a common cylinder, an upper pad member between the body and the upper saddle block, said upper pad member having a rounded portion to receive the rounded portion on the upper saddle block, said upper pad having an upward extension slidably fitted into the body, a lower pad member having a rounded portion complementary to and receiving the rounded portion of the lower saddle block, and means to secure the lower pad member to the body to hold the equalizer in pivotal weight carrying relationship to the body.

4. A tractor having a body and a pair of track frames pivotally connected at their rear ends to support the body thereon at two points, an equalizer spring carried transversely across the track frames and under the body, upper and lower saddle blocks clamped around the spring, said blocks having rounded portions which are formed as surfaces of a common cylinder, a pad having a rounded recess to fit the rounded portion of the upper block, said pad being located between the body and upper block, a second pad having a rounded recess to fit the rounded portion of the lower block, means to supply lubricant to the upper pad and distribute it to the rounded contact portions, and means to secure the lower pad to the body to hold the equalizer in pivotal weight carrying relationship to the body.

5. A tractor having a body and a pair of track frames pivotally associated at their rear ends with the body to support the same, said body having a transverse tunnel formed in its under side, a transverse equalizer spring carried under the body and through the tunnel and having its ends supported respectively on the track frames, an upper and a lower saddle block clamped to the spring, said blocks having rounded portions which are formed as surfaces of a common cylinder, a pad above the spring having a rounded recess to receive the rounded portion of the adjacent saddle block, a pad below the spring having a rounded recess to receive the rounded portion of its adjacent saddle block, and means to secure the lower pad to the body to hold the equalizer in the tunnel in pivotal weight carrying relationship to the body.

6. A tractor having a body and a pair of track frames pivotally associated at their rear ends with the body to support the same, said body having a transverse tunnel formed in its under side, a transverse equalizer spring carried under the body and through the tunnel and having its ends supported respectively on the track frames, an upper and a lower saddle block clamped to the spring, said blocks having rounded portions which are formed as surfaces of a common cylinder, a pad above the spring having a rounded recess to receive the rounded portion of the adjacent saddle block, said upper pad having an extension extending upwardly and movably mounted in the body, a pad below the spring having a rounded recess to receive the rounded portion of the adjacent saddle block, said lower pad having flanges bolted to the body to hold the equalizer in the tunnel in pivotal weight carrying relationship to the body, and means to direct lubricant to the rounded pivotal weight carrying portions.

NORMAN O. PANZEGRAU.